United States Patent [19]
Nakagawa et al.

[11] Patent Number: 5,819,295
[45] Date of Patent: Oct. 6, 1998

[54] DOCUMENT STORING AND MANAGING SYSTEM

[75] Inventors: Aki Nakagawa, Kawasaki; Yuji Kanno; Tsutomu Hata, both of Tokyo, all of Japan

[73] Assignee: Matsushita Electric Industrial Co., Ltd., Osaka, Japan

[21] Appl. No.: 721,077

[22] Filed: Sep. 26, 1996

[30] Foreign Application Priority Data

Oct. 30, 1995 [JP] Japan ................................. 7-303362

[51] Int. Cl.$^6$ .................................................. G06F 3/00
[52] U.S. Cl. .................................... 707/203; 395/703
[58] Field of Search .................................. 395/712, 703; 707/200, 201, 202, 203

[56] References Cited

U.S. PATENT DOCUMENTS

| | | | |
|---|---|---|---|
| 5,357,631 | 10/1994 | Howell et al. | 395/600 |
| 5,535,386 | 7/1996 | Wang | 395/600 |
| 5,579,509 | 11/1996 | Furtney et al. | 395/500 |
| 5,590,317 | 12/1996 | Iguchi et al. | 395/602 |
| 5,594,836 | 1/1997 | Ryu et al. | 395/62 |
| 5,600,832 | 2/1997 | Eisenberg et al. | 395/619 |
| 5,619,700 | 4/1997 | Abe | 395/703 |
| 5,634,114 | 5/1997 | Shipley | 395/500 |
| 5,649,200 | 7/1997 | Leblang et al. | 395/703 |
| 5,671,398 | 9/1997 | Neubauer | 395/500 |
| 5,675,802 | 10/1997 | Allen et al. | 395/703 |
| 5,729,744 | 3/1998 | Gerken et al. | 395/619 |

FOREIGN PATENT DOCUMENTS

| | | |
|---|---|---|
| 59-123071 | 7/1984 | Japan . |
| 2-304646 | 12/1990 | Japan . |
| 4-250563 | 9/1992 | Japan . |
| 5-89173 | 4/1993 | Japan . |
| 7-160560 | 6/1995 | Japan . |

OTHER PUBLICATIONS

Sachweh et al., "Version Management for tightly integrated Software Engineering Environments", IEEE, pp. 21–31 (1995).

Keller et al., "A Version Numbering Scheme with a Useful Lexicographical Order" IEEE pp. 240–248 (1995).

Abriola et al. "The Evolution of Configuration Management and Version Control" Software Engineering Journal (Nov. 90) pp. 303–310.

David Coleman, et al, "Groupware, Technology, and Applications", Sep. 27, 1995.

*Primary Examiner*—Thomas G. Black
*Assistant Examiner*—Michael J. Wallace, Jr.
*Attorney, Agent, or Firm*—Lowe Hauptman Gopstein Gilman & Berner

[57] ABSTRACT

A document storing and managing system for storing plural electronic documents in each of folders according to classifications and managing the stored electronic documents in a unit of the folder has a folder managing means for managing attributes of the electronic documents included in each of the folders, a document version managing means for managing information as to version of the electronic documents included in each of the folder, and a folder version managing means for managing a correspondence relation between a version of the folder and a version of each of the electronic documents included in the folder. The document storing and managing system of this invention may set and manage a version of a folder while keeping adjustability with a version of each document.

20 Claims, 15 Drawing Sheets

FIG. 4

| 411 LIBRARY ID | 412 LIBRARY NAME | LOWER LAYER LIBRARY/FOLDER 413 | | |
|---|---|---|---|---|
| 1008 | DEVELOPMENT MANAGE | 3221-REQUIRED SPEC | 3222-DEVELOPMENT DOCUMENT | 3223-PROJECT | ... |
| 1009 | MANUAL | 3002-GENERAL | 3035-NOTES | | |
| 1010 | SURVEY | 1065-PATENT | 1078-PRODUCT | 1099-REFERENCE | |
| . . | | | | | |

41 LIBRARY MANAGEMENT INFORMATION

FIG. 5

51 FOLDER LIST

| 3112 | DEVELOPMENT DOCUMENT | 5001 | 5002 | 5003 |
|------|----------------------|------|------|------|
| 3223 | PROJECT              |      |      |      |
| 3224 |                      |      |      |      |

52 FOLDER VERSION MANAGEMENT INFORMATION

| 521 FOLDER VERSION | 522 DOCUMENT VERSION BELOW THE FOLDER | | |
|---|---|---|---|
| 0.1 | 1.0 | – | – |
| 1.0 | 1.0 | 1.0 | 0.1 |
| 2.0 | 2.0 | 2.0 | 1.0 |

OLD VERSION ↔ NEW VERSION

FIG. 10

| 1010 FOLDER ID | 1011 FOLDER NAME | 1012 ENTITY MOVED VERSION INFORMATION | 1013 ENTITY MOVING TIME INFORMATION |
|---|---|---|---|
| 3112 | DEVELOPMENT DOCUMENT | 3 | |
| 3223 | PROJECT | 5 | 365 |
| 3224 | | | |
| | | | |

101 FOLDER STORAGE INFORMATION

FIG. 11

| 1110 FOLDER ID | 1111 FOLDER NAME | 1112 ENTITY DELETED VERSION INFORMATION | 1113 ENTITY DELETING TIME INFORMATION |
|---|---|---|---|
| 3534 | REQUIREMENT | 6 | 730 |
| 3535 | CLAIM | 10 | |
| 3536 | | | |
| | | | |

111 FOLDER DELETION INFORMATION

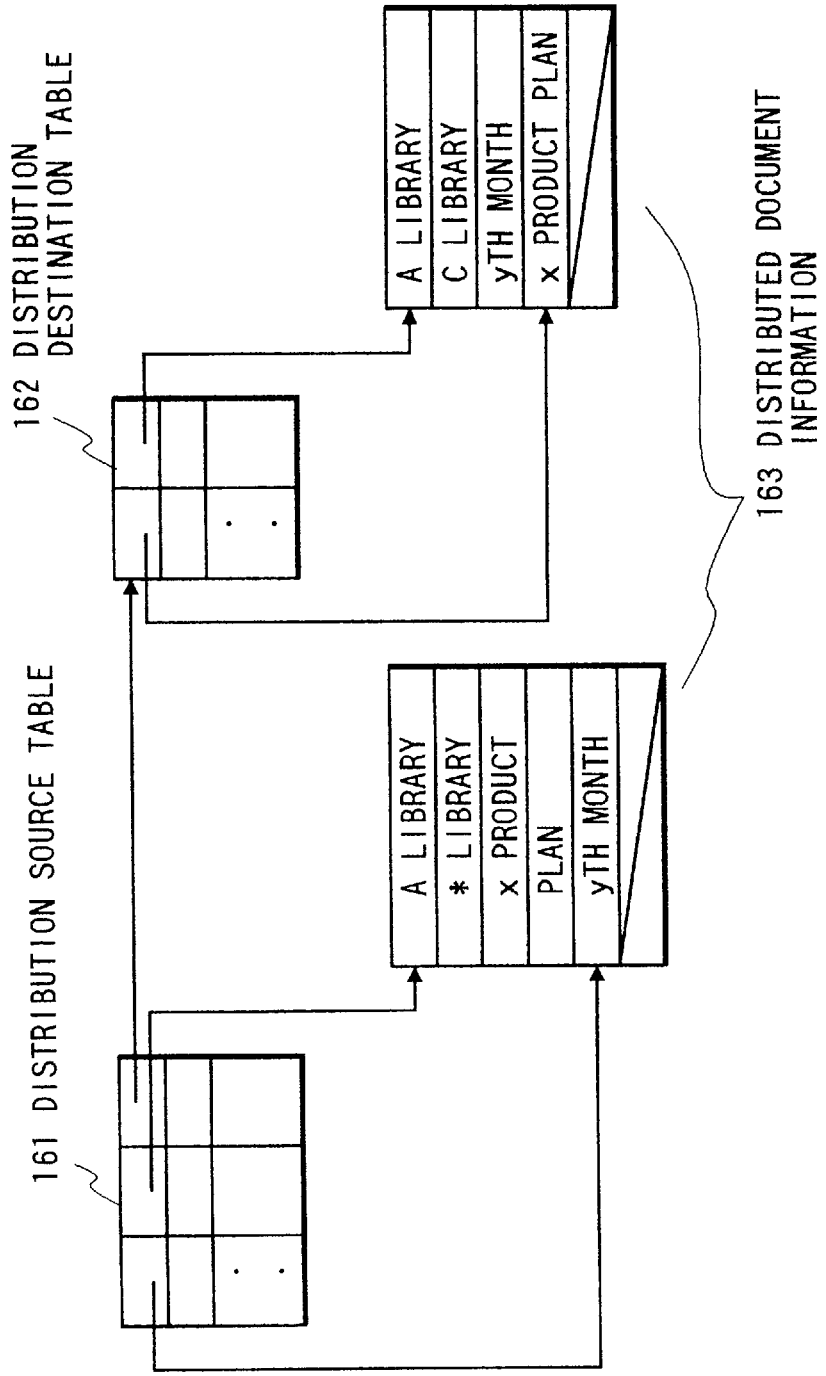

DOCUMENT STORING AND MANAGING SYSTEM

BACKGROUND OF THE INVENTION (1) Field of the Invention

The present invention relates to a document storing and managing system for collecting electronic documents in each classification to store and manage them. The present invention, in particular, enables management of formed documents according to version.

(2) Description of the Related Art

With an increasing use of personal computers and peripheral equipments such as printers, image scanners, opto-magnetic disks and the like, and high-performance document making/document editing softwares and the like operating in these equipments, document data in various forms which are images, character code strings, line pictures, moving images or a combination of these are electronically made, updated and stored in a large organization such as a company, a government office or the like in recent years.

A basic software for managing network files, a document managing software operating on a network, a groupware software and the like are developed along with network equipments so that a common document managing system which enables an organization to collectively manage electronic documents and commonly use the electronic documents in the organization is coming in practice.

By employing so-called office automation as above, improvement in productivity, improvement in quality of business, efficient use of office by paperless works are expected.

Main functions of such the common document managing system or an example of the typical system are described in detail in "Groupware, Technology and Applications" (David Coleman, Raman Khamna, Prentice-Hall, U.S.A., ISBNO-13-305194-3), for example.

Devices realizing functions to manage documents in a large unit which is a collection of related documents, classify documents or set a keyword for the purpose of rapid and accurate retrieval on documents and manage versions in consideration of updating of documents are important in such the common document managing system.

Techniques realizing such devices are disclosed in Japanese Patent Application Laid-Open Publications Nos. 2-304646, 7-160560, 5-89173, 4-250563 and 59-123071.

Japanese Patent Laid-Open Publication No. 2-304646 discloses a technique of recording information as to a combination of files in a file to manage versions of the combination of plural files as same as files.

Japanese Patent Laid-Open Publication No. 7-160560 discloses a technique of conducting exclusive control relying on version of document data having plural versions without especial awareness of the user.

Japanese Patent Laid-Open Publication No. 5-89173 discloses a technique of making a designation for classifying a result of retrieval when a document having attributes such as a date when a document was made, a person having made the document and the like to dynamically classify the result of retrieval in a virtual folder.

Japanese Patent Laid-Open Publication No. 4-250563 discloses a technique of automatically moving and registering a document file low in frequency of utilization among document files stored on a high-speed auxiliary storage device into a low-speed, large-capacity auxiliary storage device.

Japanese Patent Laid-Open Publication No. 59-123071 discloses a technique of automatically extracting a document file low in frequency of retrieval and reference as a document that should be discarded according to a retention period or a frequency of retrieval.

The general document storage managing systems described in the above publications and reference cannot set a folder which is a collection of plural documents belonging to the same classification as a unit of operation to delete documents in old versions or move a storing place of documents in old versions in a unit of folder. It is also impossible to designate a version to retrieve or refer related documents collected in a folder since the general document storage managing systems do not manage versions in a folder including the documents in a unit of folder while keeping adjustability with updating of versions of each document.

In the light of the above drawback, an object of the present invention is to provide a document storing and managing system which can execute version management in a unit of folder to retrieve documents by designating a version or move and discard documents in a unit of folder in the operation.

SUMMARY OF THE INVENTION

The present invention therefore provides a document storing and managing system for storing plural electronic documents in each of folders according to classifications and managing the stored electronic documents in a unit of the folder comprising a folder managing means for managing attributes of the electronic documents included in each of the folders, a document version managing means for managing information as to versions of the electronic documents included in each of the folders, and a folder version managing means for managing a correspondence relation between a version of the folder and a version of each of the electronic documents included in the folder.

According to the document storing and managing system of this invention, it is possible to manage a version of a folder in a unit of folder below which plural documents are collected in a hierarchical structure according to classifications while keeping adjustablity with an updated version of each document included in the folder.

The document storing and managing system may further have a retrieving means for retrieving a designated version of a folder as an object of the retrieval, a document entity moving means or a document entity deleting means for moving or deleting documents together included in a designated version of a folder, or a document distributing means for copying the latest version of a document in a folder when the latest version is newly made to distribute it to another folder.

It is thereby possible to specify a version of a folder to retrieve related documents in each folder as a unit of operation, move documents in old versions to another storage place collectively, or delete documents in old versions collectively.

Further, if a certain document is required to be treated in plural folders, it is possible to use it separately in plural folders.

In the document storing and managing system of this invention, the user can have a freedom to copy a paper document to use it. Besides, the user can attentively conduct version management, storage management or document retrieval on a collection of documents.

With the above structure, the document storing and managing system of this invention makes it possible to set and manage a version of a folder while keeping adjustability with a version of each document so as to specify a version of the folder, thereby executing various operations in a unit of folder.

BRIEF DESCRIPTION OF THE DRAWINGS

FIG. 4 is a diagram showing library management information used for library management in the system according to this invention;

FIG. 5 is a diagram showing a folder list used for version management in the system according to this invention;

FIG. 10 is a diagram showing folder storage information used for management when a document is moved in the system according to the second embodiment;

FIG. 11 is a diagram showing folder deletion information used for management when a document is deleted in the system according to the second embodiment;

FIG. 16 shows an information structure used to manage distribution relation information in the system according to the third embodiment.

Figure 1:
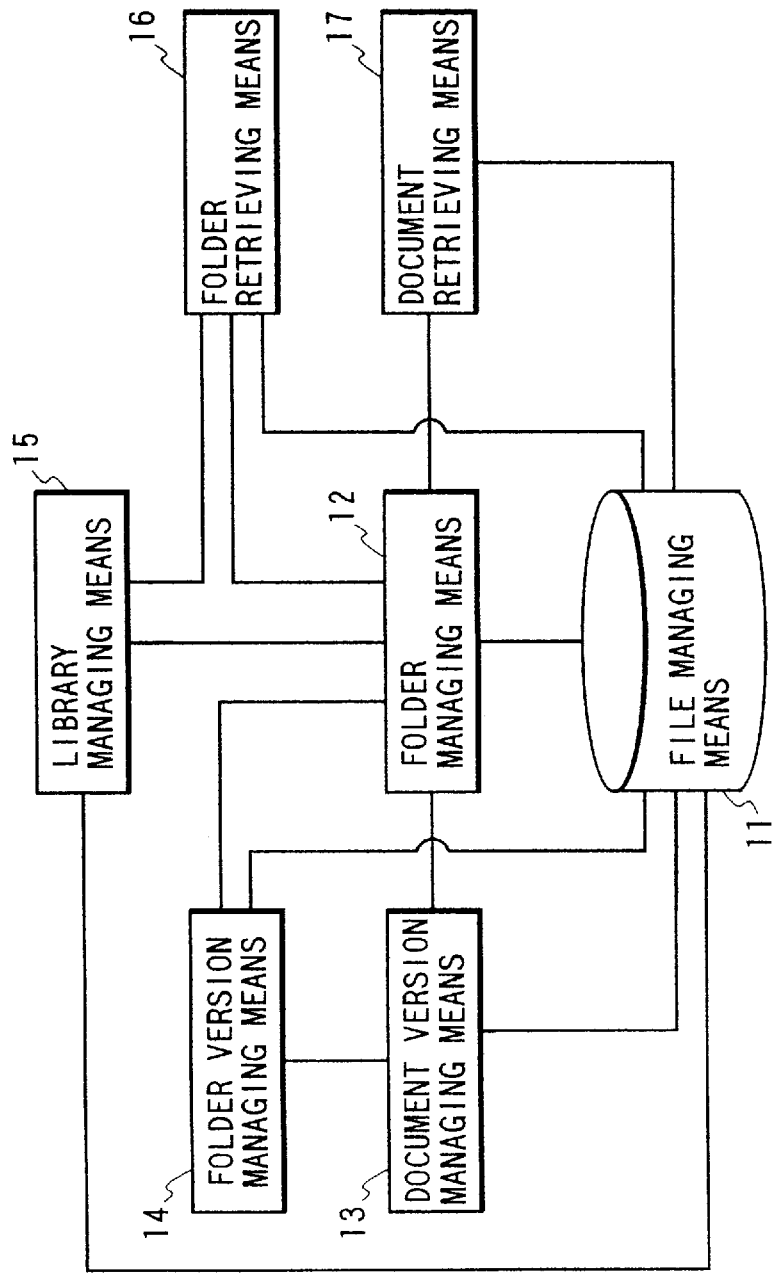
FIG. 1 is a block diagram showing a document storing and managing system according to a first embodiment of this invention.

DETAILED DESCRIPTION OF THE PREFERRED EMBODIMENTS (a) Description of Aspects of the Invention As an aspect of this invention, a document storing and managing system according to the invention is aimed to store plural electronic documents in each of folders according to classifications and manage the stored electronic documents in a unit of the folder. The document storing and managing system has a folder managing means for managing attributes of the electronic documents included in each of the folders, a document version managing means for managing information as to version of the electronic documents included in each of the folder, and a folder version managing means for managing a correspondence relation between a version of the folder and a version of each of the electronic documents included in the folder. The document storing and managing system of this invention may set and manage a version of a folder while keeping adjustability with a version of each document.

The above document storing and managing system may further have a library managing means for collecting plural folders to manage them, thereby hierarchically managing the documents.

In the above document storing and managing system, the folder version managing means may manage a correspondence relation between a version of the folder and a version of the electronic document selected by the user correspondingly thereto, thereby setting a version of the folder on the basis of an instruction of the user.

In the above document storing and managing means, if the user omits designation of a version of the electronic document, the folder version managing means may assume that the latest version is selected so as to set the correspondence relation of the electronic document, whereby an operation of the user may be simplified.

As another aspect of this invention, a document storing and managing system according to the invention is aimed to store plural electronic documents in each of folders according to classifications and manage the stored electronic documents in a unit of the folder. The document storing and managing system has a folder managing means for managing attributes of the electronic documents included in each of the folders, a document version managing means for managing information as to version of the electronic documents included in each of the folder, and a folder version managing means for managing a correspondence relation between a version of the folder and a version of each of the electronic documents included in the folder, a folder retrieving means for retrieving a folder including an electronic document or a classification coinciding with designated retrieval conditions among designated objects of retrieval, and a document retrieving means for retrieving an electronic document that is an object of the retrieval included in the retrieved folder. The document storing and managing system of this invention may retrieve a document in a unit of folder.

In the above document storing and managing system, the folder retrieving means may retrieve a folder in a version designated as an object of retrieval, whereby it is possible to designate a version of the folder to conduct the retrieval.

In the above document storing and managing system, as the version of the folder that is an object of the retrieval, n versions counted from the latest version of the folder in the order of their ages are designated, whereby plural versions updated recently may be designated as an object of the retrieval.

In the above document storing and managing system, the document retrieving means may retrieve electronic documents included in the folder in a version retrieved by the folder retrieving means and present a result of the retrieval, whereby related documents belonging to the same classification included in the designated version of the folder are presented to the user in a unit of folder.

In the above document storing and managing system, as the retrieval conditions, a classification/document name and a keyword included in the classification/document name are designated, thereby preventing an undesirable classification/document from being retrieved.

In the above document storing and managing system, the designation of a classification/document name is made in a regular expression, whereby it is possible to set appropriate retrieval conditions in a simple expression.

As still another aspect of this invention, a document storing and managing system according to the invention is aimed to store plural electronic documents in each of folders according to classifications and manage the stored electronic documents in a unit of the folder. The document storing and managing system has a folder managing means for managing attributes of the electronic documents included in each of the folders, a document version managing means for managing information as to version of the electronic documents included in each of the folder, a folder version managing means for managing a correspondence relation between a version of the folder and a version of each of the electronic documents included in the folder, and a document entity moving means for moving a place for storing files of all electronic documents in designated versions in the folder. The document storing and managing system may move documents included in a specific version of the folder together in a unit of folder in the operation.

In the above document storing and managing system, the document entity moving means may move the place for storing files of the electronic documents to a low-speed, large-capacity medium, thereby storing documents in new versions high in frequency of utilization in a high-speed medium leaving a margin.

In the above document storing and managing system, a document in a version having a number exceeding a predetermined number counted from the latest version of the folder is designated as an object of the move in the document entity moving verss so that a document in an old version is moved whenever a new version of a folder is made.

In the above document storing and managing system, a document in a version stored for a period exceeding a predetermined period having elapsed from when the document was made is designated as an object of the move in the document entity moving means so that an old version is moved.

As still another aspect of this invention, a document storing and managing system according to the invention is aimed to store plural electronic documents in each of folders according to classifications and manage the stored electronic documents in a unit of the folder. The document storing and managing system has a folder managing means for managing attributes of the electronic documents included in each of the folders, a document version managing means for managing information as to version of the electronic documents included in each of the folder, a folder version managing means for managing a correspondence relation between a version of the folder and a version of each of the electronic documents included in the folder, and a document entity deleting means for deleting files of all electronic documents in designated versions in the folder. The document storing and managing system may collectively delete documents in older versions in the folder.

In the above document storing and managing system, a document in a version having a number exceeding a predetermined number counted from the latest version of the folder is designated as an object of the deletion in the document entity deleting means so that a document in an old version may be deleted whenever a new version of the folder is made.

In the above document storing and managing system, a document in a version stored for a period exceeding a predetermined period having elapsed from when the document was made is designated as an object of the deletion in the document entity deleting means so that an old version may be deleted.

As still another aspect of this invention, a document storing and managing system according to the invention is aimed to store plural electronic documents in each of folders according to classifications and manage the stored electronic documents in a unit of the folder. The document storing and managing system has a folder managing means for managing attributes of the electronic documents included in each of the folders, a document version managing means for managing information as to version of the electronic documents included in each of the folder, a folder version managing means for managing a correspondence relation between a version of the folder and a version of each of the electronic documents included in the folder, a distribution information managing means for managing distribution information designating a distribution destination of a specific electronic document included in a specific folder, and a document distributing means for copying the specific electronic document included in the latest version of the folder as the latest version of a specific electronic document of a folder that is a distribution destination according to the distribution information to update a version of the folder that is the distribution destination. The document storing and managing system may copy a document to place it in different folders if it is necessary to use the document in the different folders so as to enable the user to freely use the document in each of the different folders.

Now, description will be made of embodiments of this invention referring to the accompanying drawings.

(b) Description of a First Embodiment

Figure 2:
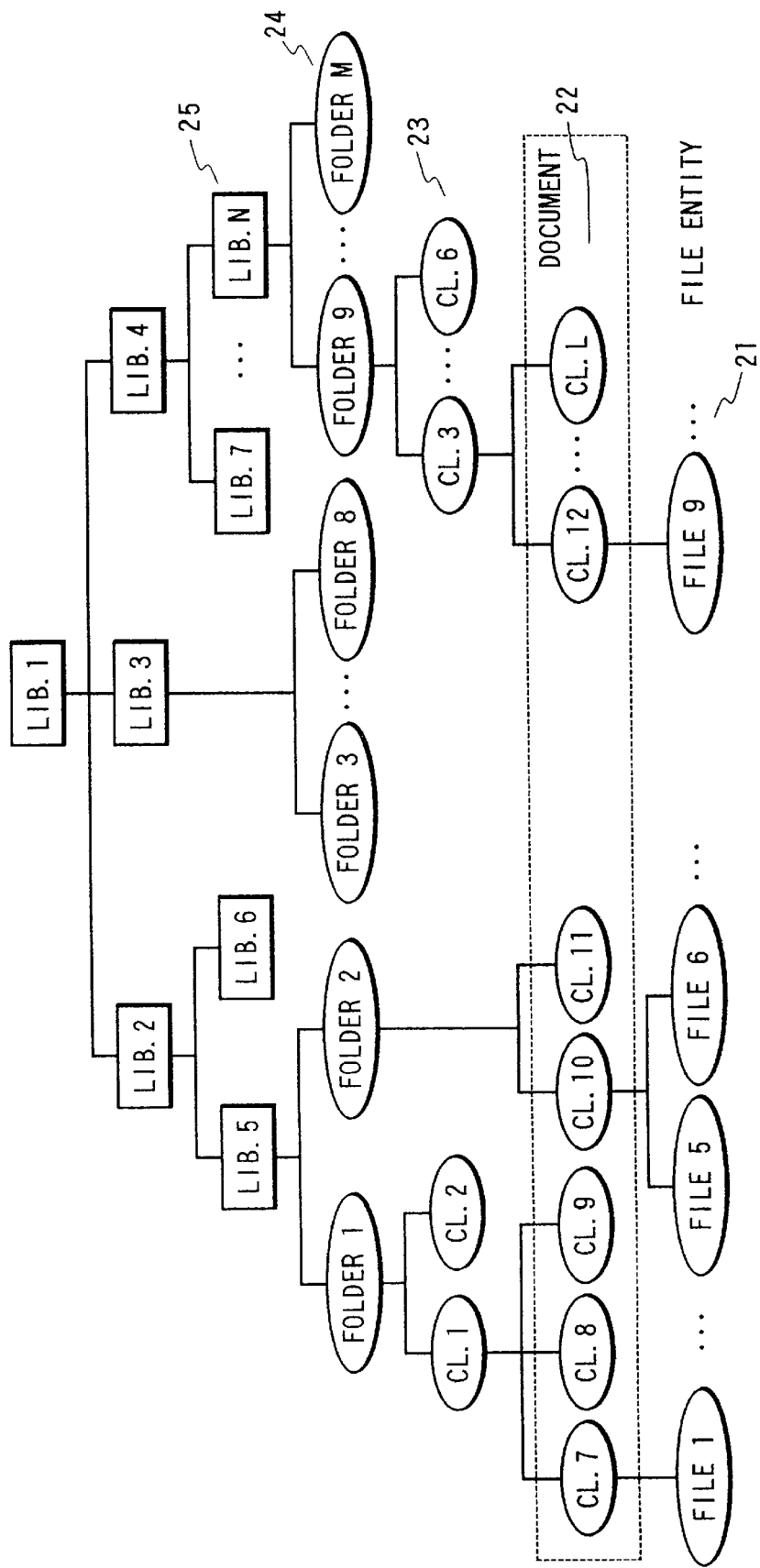
FIG. 2 is a diagram showing a hierarchical structure of document groups in the system according to this invention.

First, a system of hierarchical arrangement of document groups in a system according to this invention will be described. The system of this invention arranges and manages document groups in a hierarchical structure shown in FIG. 2. In FIG. 2, reference numeral 21 denotes a file in which document data is actually recorded. A collection of one file 21 or more configures a document 22. Classification 23 is a partition concept used for hierarchically arranging the documents 22. Incidentally, the document may be regarded as a kind of the classification.

The document 22 is placed in each folder 24 on the basis of the hierarchical structure of the classification 23. For instance, the folder "1" includes documents categorized as classifications "7", "8" and "9", which are lower classifications of the classification "1", and a document categorized as a classification "2". A plurality of the folders 24 are collected and accommodated in a library 25 according to an instruction of the user. The library 25 may be set as a collection of another plural libraries 25.

A document storing and managing system according to this embodiment of this invention has, as shown in FIG. 1, a file managing means 11 for storing and managing each version of the documents, a folder managing means 12 for managing documents included in each folder according to a hierarchical structure of the classification, a library managing means 15 for managing each library, a folder version managing means for managing versions of the folder, a document version managing means 13 for managing versions of each document in the folder, a folder retrieving means for retrieving a folder in a designated version in the library, and a document retrieving means 17 for retrieving a document in a designated version in the folder.

The file managing means 11 gives a unique name to each of all formed files, and stores and manages them.

Figure 3:
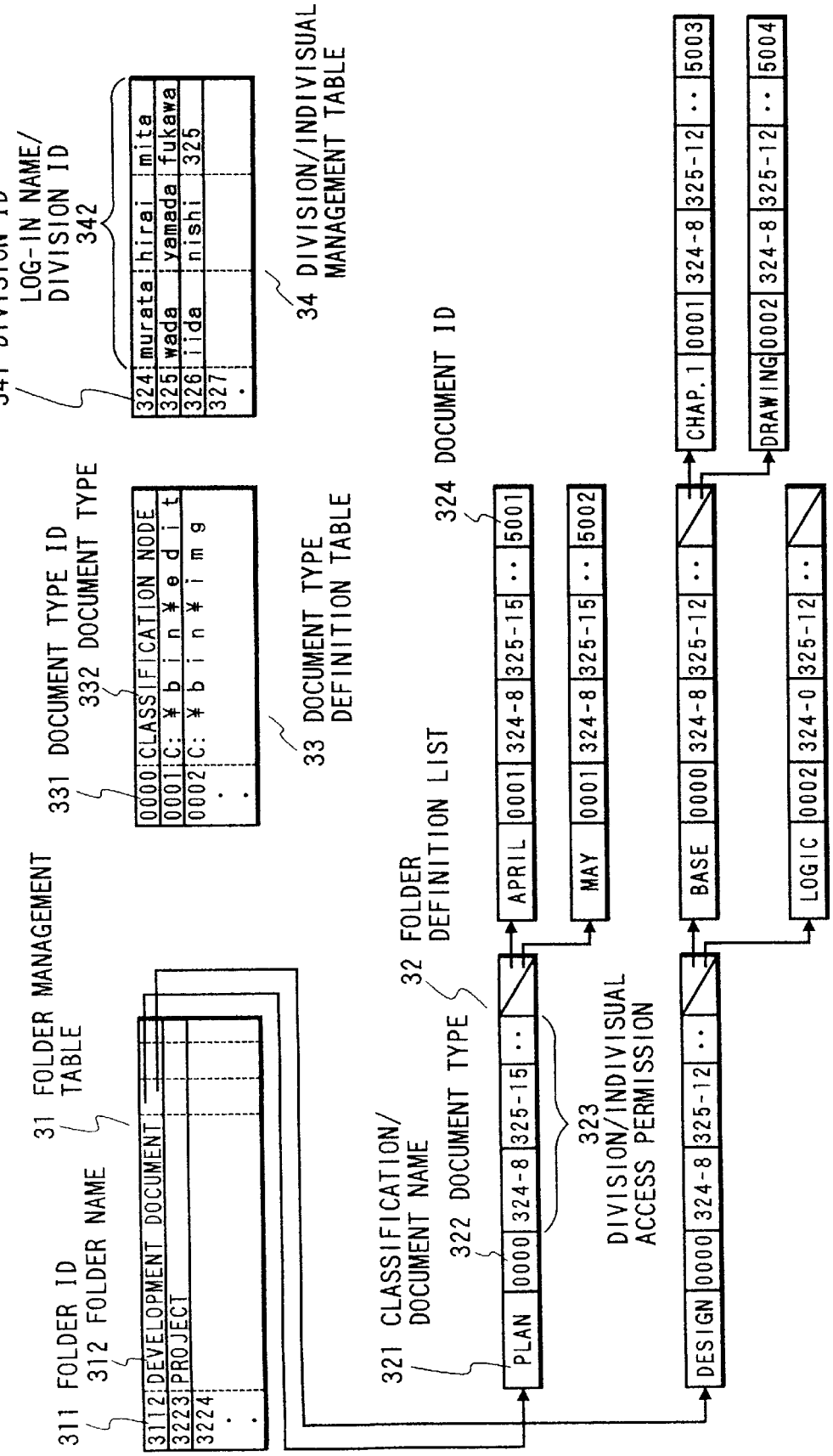
FIG. 3 is a diagram showing a folder management table and a folder definition list used for document management in a folder in the system according to this invention.

The folder managing means 12 manages documents included in each of the folders according to folder management information shown in FIG. 3. The folder management information is configured with a folder management table 31 in which an ID and a folder name of each folder are described, and a folder definition list 32 in which classification/document name, a document type, access rights and the like included in each folder are described.

In the folder management table 31, a folder ID 311 uniquely given to each folder, a folder name 312 corresponding to the folder ID and a pointer to the folder definition list 32 are described. The number of the pointers in each folder is in equal to the number of classifications immediately below that folder in FIG. 2. For instance, the folder "1" in FIG. 2 has two pointers.

To the folder definition list 32, folder definition lists of classification/document are successively linked by the pointers according to the hierarchical structure of classifications and documents shown in FIG. 2. In the folder definition list 32, a classification or a document name 321, a type of that document 322, an access permission as to that classification or that document 323 are defined, besides pointers to a folder definition list of classifications or documents in a further lower layer are described.

As the document type 322, one of types defined in a document type definition table 33 is described. The document type definition table 33 is configured with a document type ID 331 and a document type 332. One of the document types 332 represents that it is not a document but a classification node. As the normal document type 332, a pass to a viewer/editor used to display/edit the document is set. In the folder definition list 32, a document type ID of a corresponding type is described.

In a column of the access permission 323, a division ID defined in a division/individual management table 34 and a value representing contents of the access permission are described as a pair. In the division/individual management table 34, a log-in name or another division ID 342 having been defined is defined correspondingly to the division ID 341. The access permission is classified into four permissions, that is, (1) reference permission, (2) write permission, (3) revision permission and (4) deletion and classification structure alteration permission. Four bits are used to represent these four access permissions. 1 is set at the fourth bit in the case of the reference permission, the third bit in the case of the write permission, the second bit in the case of the revision permission, and the first bit in the case of the deletion and classification structure alteration permission. For instance, "324-8" shown in the column of the division/indivisual access permission 323 in the folder definition list 32 in FIG. 3 represents that an access permission of only the reference permission is given to a user having a log-in name "murata, hirai and mita" in a division having a division ID "324".

At the end of the folder definition list 32, a pointer used to access to the next folder definition list is described if the document type 322 is a classification node (that is, the document type is "0000"). If the document type 322 is not the classification node, a document ID 324 of a defined document is described. If the document ID is set, it stands for that there is no folder definition list in the lower layer.

The folder managing means 12 manages the folders using these lists. The folder management information structure shown in FIG. 3 is usually stored as file in the file managing means 11. If the user refers, alters or creates a folder, or retrieves a document, the folder management information structure is read out and mapped on a working storage in the form shown in FIG. 3.

In the folder definition list 32, it is possible to describe a pointer to a folder type definition list in the upper layer in consideration of convenience upon presenting a folder to the user.

In order to re-use a definition of a folder having been made once, the folder managing means 12 may manage a list of the folder definitions, display the list when the user newly makes a folder, and set items of the folder definition selected in the list to the folder newly made. This can largely save the user the trouble at the time of making a folder.

The library managing means 15 manages folders stored in a library using library management information 41 shown in FIG. 4. The library management information 41 is configured with a library ID 411, a library name 412 and a library/folder ID 413 defining libraries or folders existing immediately below the library.

If the user makes a new library, the library managing means 15 allocates a new library ID to it, sets a library name on the basis of an instruction of the user, and sets a library or a folder that should exist below the new library as a lower layer library/folder 413. In the lower layer library/folder 413 of the library management information 41, a pair of a library ID and a library name, a pair of a folder ID and a folder name is described. If a library ID is set, it is possible to find presence of a library or a folder further below by tracing the library ID 411.

As a method of knowing whether information described in the lower layer library/folder 413 is information of a library or information of a folder, it is possible set different ranges of IDs to the library and the folder such that a range of an ID of the library is set to not less than 1000 to not more than 2000, whereas a range of an ID of the folder is set to not less than 3000 to not more than 4000. Alternatively, it is possible to set a flag to discriminating the library from the folder, or use a pointer to the library information and a pointer to the folder information instead of the IDs.

Next, description will be made of management of versions of the folders.

Figure 6:
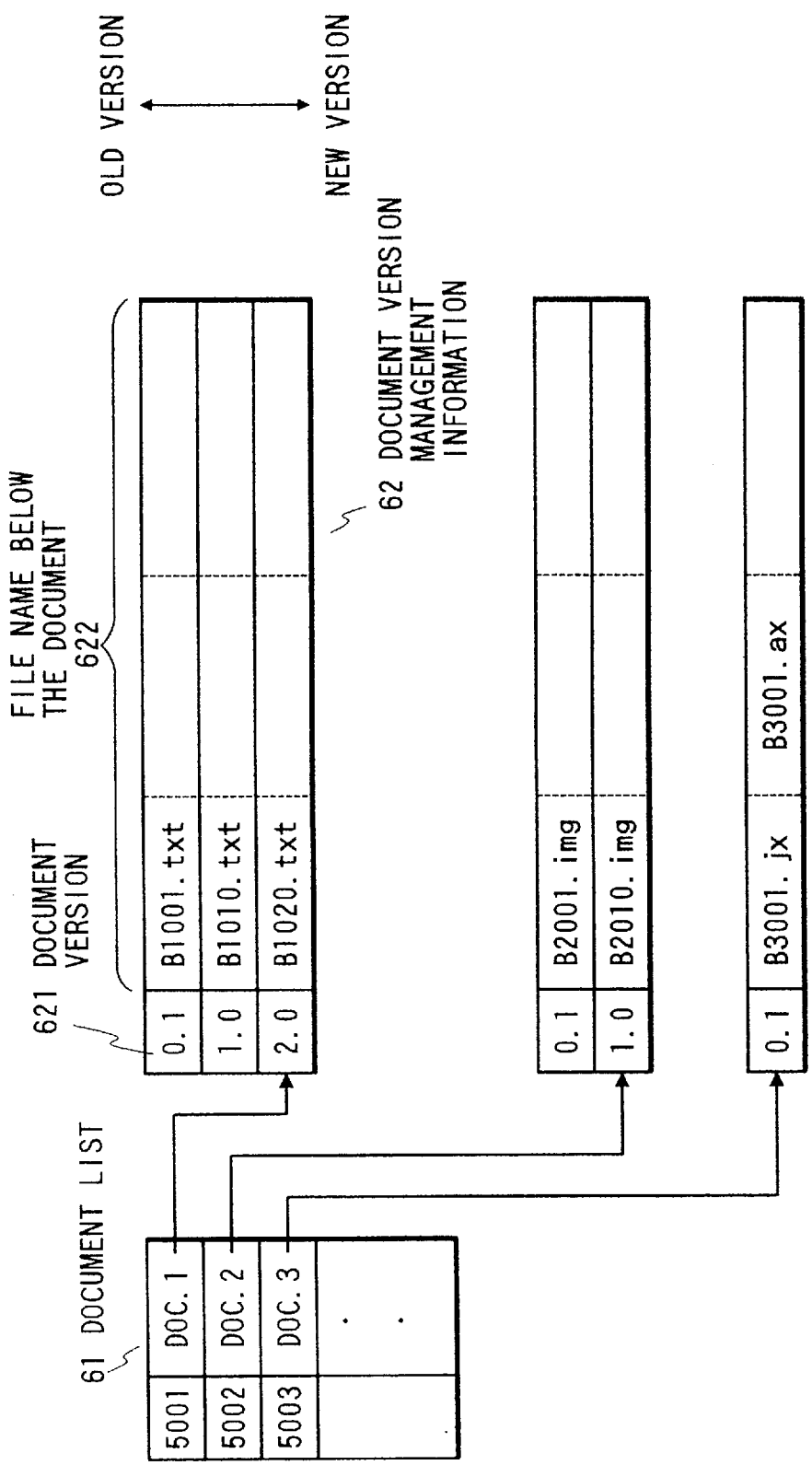
FIG. 6 is a diagram showing a document list used for the version management in the system according to this invention.

The folder version managing means 14 manages versions of the folders using a folder list in which IDs of documents included in each folder are described and folder version management information 52 specifying versions of the folders as shown in FIG. 5. The document version managing means 13 manages versions of documents included in a folder using a document list 61 of documents included in the folder and document version management information 62 in which file names included in each of the documents are described for each version as shown in FIG. 6.

In the folder list 51, a folder ID, a folder name, a document ID group belonging to the lower layer and a pointer to the folder version management information 52 are described. When the folder managing means 12 makes the folder management table 31 and the folder definition list 32 when a folder is made or a folder definition is altered, the folder version managing means 14 simultaneously makes the folder list 51 to describe IDs of documents in the lower layer. The document version managing means 13 makes the document list 61 simultaneously with that. If a document is added to the folder definition list 32, the folder version managing means 14 simultaneously adds a document ID group of the folder list 51, and the document version managing means 13 adds document items to the document list 61.

If a document below a certain folder is newly made, the document version managing means 13 adds that document to the document list 61 besides making the document version management information 62 to write a pointer to that document version management information 62 in a column of that new document in the document list 61. The document version management information 62 is configured with columns in which a document version 621 and file names below the document are described. As the document version 621, a version number (0.1 in the case where the document is newly made) is described.

If contents of a document below a certain folder is updated, the document version managing means 13 adds a line to the document version management information 62 to described a version number in the column of the document version 621 and describe a file name below the document in the column of 622, then changes a pointer from the document list 61 to the added line. The version number 621 of this document may be automatically given in the order set in advance by the system or designated on occasion by the user.

Following that, if the user instructs to update a version of a folder, the folder version managing means 14 displays the document list 61 managed by the document version managing means 13 and the document version 621 of each document in the version management information 62, whereby the user selects a version of each document in the lower layer of the folder to designate it.

When the user selects a version of each document, the folder version managing means 14 adds a line to the folder version management information 52, and describes the selected version of each of the documents in a column of the "document version below the folder" 522. Besides, the folder version managing means 14 describes the version number of the folder version 521 of a combination of these documents, and changes a pointer from the folder list 51 of the updated folder to the added line of the folder version management information 52.

In the example shown in FIG. 5, the folder having a folder ID "3112" and a folder name "development document" includes three documents having documents IDs "5001", "5002" and "5003". A combination of these three documents is set as the "development document" in version "2.0" such that the document "5001" is in version "2.0", the document "5002" is in version "1.0" and the document "5003" has no setting, as shown in the bottom line of the folder version management information 52. Incidentally, if the user omits designation of a version, the latest version is automatically set as a version of each document.

For the purpose of easy selection of version of the document by the user, it is possible to add a comment column about a version of the document so as to describe memorandum as to a version of the document. Similarly, it is possible to add a comment column as to a version of the folder in the folder version management information 52 in FIG. 5 so as to describe a memorandum as to a version of the folder for the purpose of convenience to the user who uses a version in the past of the folder.

It is further possible to add the folder version management information shown in FIG. 5 and the document version management information shown in FIG. 6 to the folder management table and the folder definition list in FIG. 3 so as to manage the folders, folder versions and document versions together.

Next description will be of a method of retrieving a document.

Figure 7:
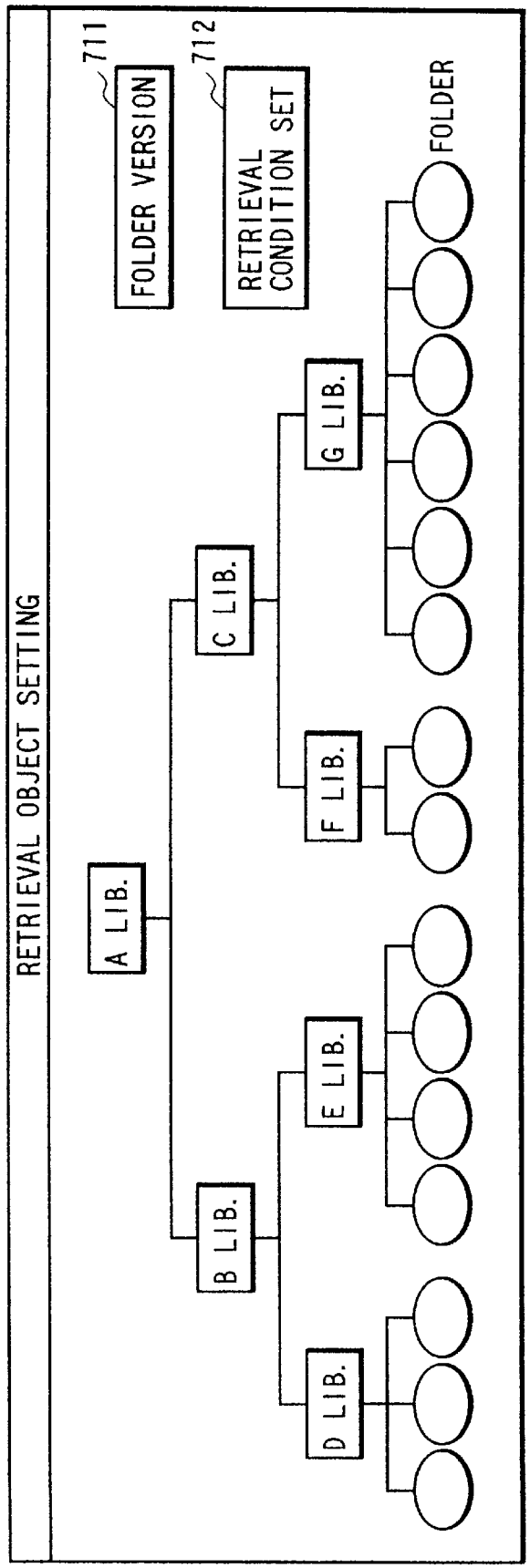
FIG. 7 shows an example of a dialogue window used to set an object of retrieval in the system according to this invention.

At the time of retrieving, the user first selects plural libraries and folders that are to be objects of the retrieval. In order to facilitate the selection, the folder retrieving means 16 displays, as shown in FIG. 7, a hierarchical structure of libraries and folders on a dialogue window on the basis of the library management information 41 managed by the library managing means 15 or displays a list of libraries/folders so that the user can directly input a selection from the dialogue window shown in FIG. 7. If the user designates "folder version" 711 on the dialogue window, the folder retrieving means 16 displays a list of versions relating to the selected folder from the folder list 51 and the folder version management information 52 managed by the folder version managing means 14 so that the user can set a version that is an object of the retrieval. If the user does not designate a version the folder, the folder retrieving means 14 sets a folder in the latest version as an object of the retrieval.

Figure 8:
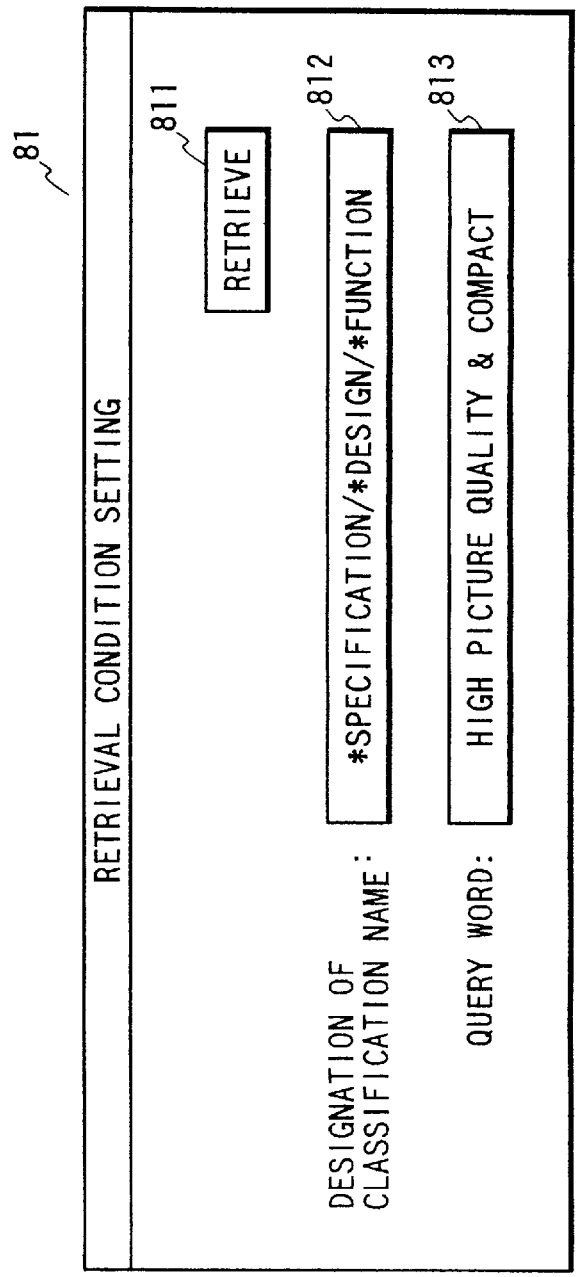
FIG. 8 shows an example of a dialogue window used to set retrieval conditions in the system according to this invention.

If the user sets "retrieval condition setting" 712, the folder retrieving means 16 displays a retrieval condition setting dialogue window shown in FIG. 8.

The user sets designation of a classification name 812 and a query word as the retrieval condition 813. When the user pushes a retrieval executing button 811, the folder retrieving means 16 reads out the folder management table 31 and the folder definition list 32 stored in the file managing means 11, and retrieves a folder having the designated classification name as a classification/document and having classifications or documents including the query word in their classification/document names in the lower layer.

When setting a classification name as the retrieval condition, the user sets, for example, "*function*" document below "*design" classification below "*specification" classification, as shown in FIG. 8. "*" stands for a regular expression replacing a character string with a symbol. It is also possible to designate a classification name using an expression defined by another regular expression.

The query word is a keyword used in the retrieval. In this example, classifications or documents having "high-picture quality" and "compact" in their classification names is retrieved among the classifications and documents having the designated classification name, and a folder including these classifications or documents in the lower layer is outputted as a result of the retrieval by the folder retrieving means 16.

On the other hand, the document retrieving means 17 reads out the folder list 51, the folder version management information 52, the document list 61 and the document version management information 62 stored in the file managing means 11, reads which version each of the documents in the folder version 521 designated by the user of the folder retrieved by the folder retrieving means 16 is in from the "document version below the folder" 522 in the folder version management information 52, and retrieves documents in the corresponding version from the document list 61 and the document management information 62.

When the document retrieval is completed, the folder retrieving means 16 displays a folder as a result of the retrieval to the user, whereas the document retrieving means 17 displays a document group matched in the retrieval to the user.

As above, the document storing and managing system can manage versions of a folder which is a collection of plural documents. In addition, the document storing and managing system can select each version of documents in the lower layer for each version of a folder. It is therefore possible to conveniently manage versions of document groups in a large-scale structure without spoiling relations among the documents.

It is also possible to set an access right or a type of a document to a collection of plural documents in the lower layer. Moreover, it is possible to manage folder definitions having been set once to re-use them, thereby readily configuring a document system having a complex document structure or access permission setting.

Further, the document storing and managing system enables the user to designate a hierarchical classification name as the document retrieval condition in a regular expression so as to designate a folder in a old version as an object of the retrieval. The user can thereby obtain a desired document through the retrieval. A result of the retrieval is obtained in a unit of folder so that documents meeting the retrieval condition and documents relating thereto may be represented together. Whereby, the user can refer useful information together.

(c) Description of a Second Embodiment

In a document storing and managing system according to a second embodiment, it is possible to delete documents or move documents in a unit of folder.

Figure 9:
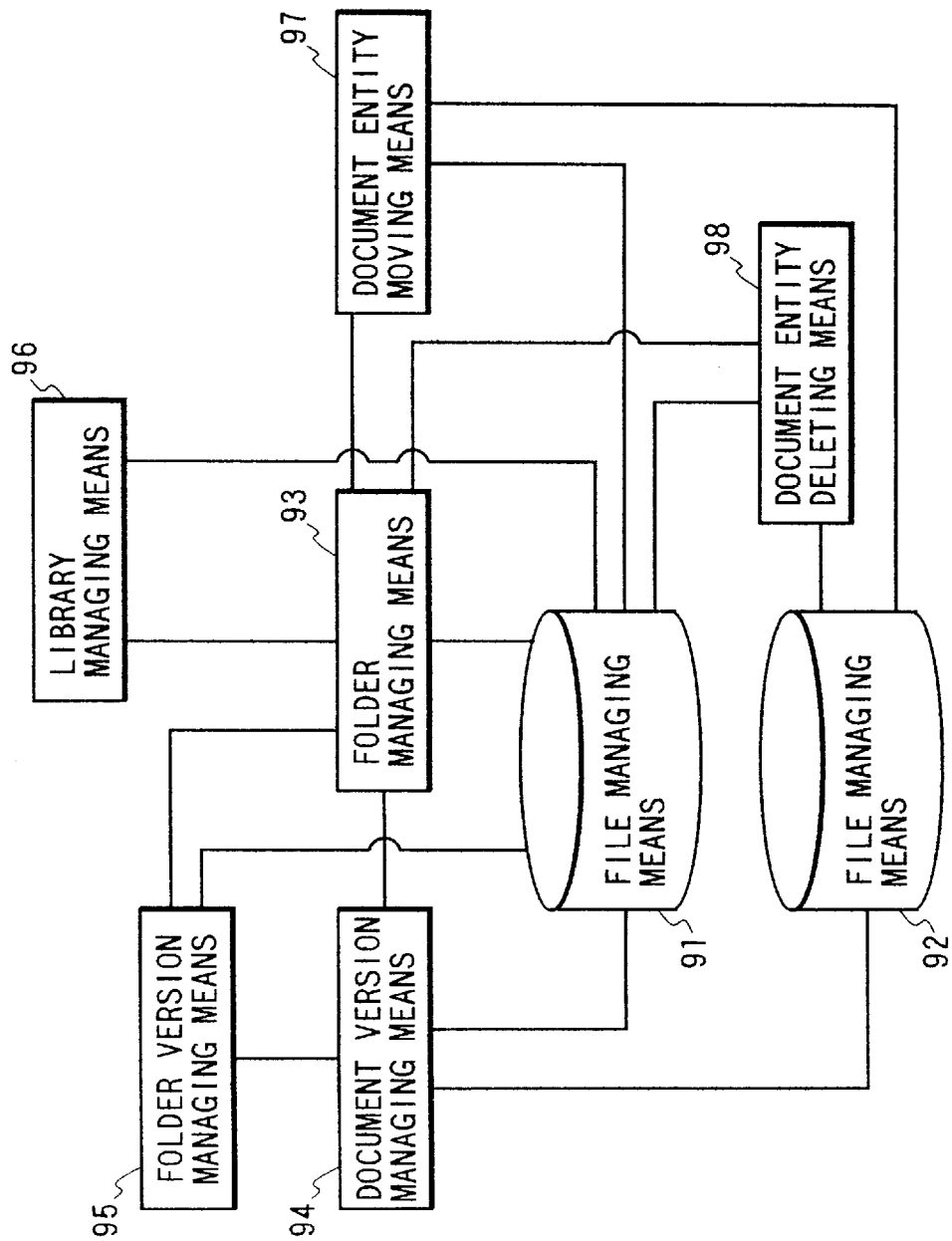
FIG. 9 is a block diagram showing a document storing and managing system according to a second embodiment of this invention.

This system has, similarly to the system according to the first embodiment, a file managing means A91, a folder managing means 93, a library managing means 96, a folder version managing means 95 and a document version managing means 94 as shown in FIG. 9. In addition, the system has a file managing means B92 for storing and managing documents older than a certain version, a document entity moving means 97 for moving documents in an old version in a unit of folder from the file managing means A91 to the file managing means B92, and a document entity deleting means 98 for deleting documents in an old version in a unit of folder.

A method of moving document entities used in this system will be next described.

The document entity moving means 97 manages a folder storage information 101 used to set a timing to move document entities in a folder from the file managing means A91 to the file managing means B92. The folder storage information 101 is ocnfigured with, as shown in FIG. 10, a folder ID 1010, a folder name 1011, entity moved version information 1012 used to designate as to from which version counted from the latest version the documents should be moved, and entity moving time information 1013 designate a period of time having elapsed when the folder was made during which the documents should be stored and after which the documents should be moved.

When the folder is made and the folder managing means 93 makes the folder management table 31 and the folder definition list 32, the document entity moving means 97 simultaneously adds one line to the folder storage information 101, describes an folder ID 1010 and a folder name 1011 of the made folder, and describes the entity moved version information 1012 and the entity moving time information 1013 as to that folder set by the user.

When the fifth-version of the folder is newly made under a condition where the entity moved version information 1012 is set to 3, the document entity moving means 97 examines versions older than the third version counted from the latest version, that is, the first and second versions of that folder, in the folder list 51 and the folder version management information 52, obtains documents from the document list 61 and the document version management information 62, and moves the documents in the corresponding versions included in the folder from the file managing means A91 to the file managing means B92.

If the entity moving time information 1013 is set to 365, the document entity moving means 97 determines documents in a version made previously to 365 days counted from the current date among documents in various versions in the folder from the folder list 51, the folder version management information 52, the document list 61 and the document version management information 62, and moves all documents in the corresponding version in the folder from the file managing means A91 to the file managing means B92.

If both of the entity moved version information 1012 and the entity moving time information 1913 are set, the document entity moving means 97 moves documents in version corresponding to at least either one in the folder in a unit of folder from the file managing means A91 to the file managing means B92.

As to a folder to which neither the entity moved version information and the entity moving time information are set, all versions are kept to be stored in the file managing means A91.

Next, a method of deleting document entities used in this system will be described.

The document entity deleting means 98 manages folder deletion information 111 used to set a timing to delete document entities in a folder from the file managing means A91 or the file managing means B92. The folder deletion information 111 is configured with, as shown in FIG. 11, a folder ID 1110, a folder name 1111, an entity deleted version information 1112 designating as to from which version counted from the latest version of the documents should be deleted, and entity deleting time information 1113 designating a period of time having elapsed from when the folder was made during which the documents should be stored and after which the documents should be deleted.

A manner of managing and making the folder deletion information 111 or executing deletion of documents on the basis of the folder deletion information by the document entity deleting means 98 is similar to the move of the document entity moving means 97 excepting a difference between deletion and move. The document entity deleting means 98 deletes documents in corresponding versions in the folder in a unit of folder on the basis of the entity deleted version information 1112 and the entity deleting time information 1113 set by the user.

According to this system, it is possible to set storage of each folder which is a collection of plural documents to plural file managing means. For this, if a document managing system has a high-speed medium such as a hard disk and a low-speed, large-capacity medium such as an optical disk, it is possible to store new versions ordinary used in a high-speed medium, and move old versions not ordinary used and merely stored to a low-speed, large-capacity medium, whereby a capacity of the disk may be efficiently used and it becomes unnecessary to manually arrange old versions.

Further, it is possible to set deletion to each folder so that a capacity of the disk may be efficiently used and it becomes unnecessary to manually arrange old versions.

(d) Description of a Third Embodiment

A document storing and managing system according to a third embodiment can distribute a document included in a certain folder as a document in the latest version of another folder.

Figure 12:
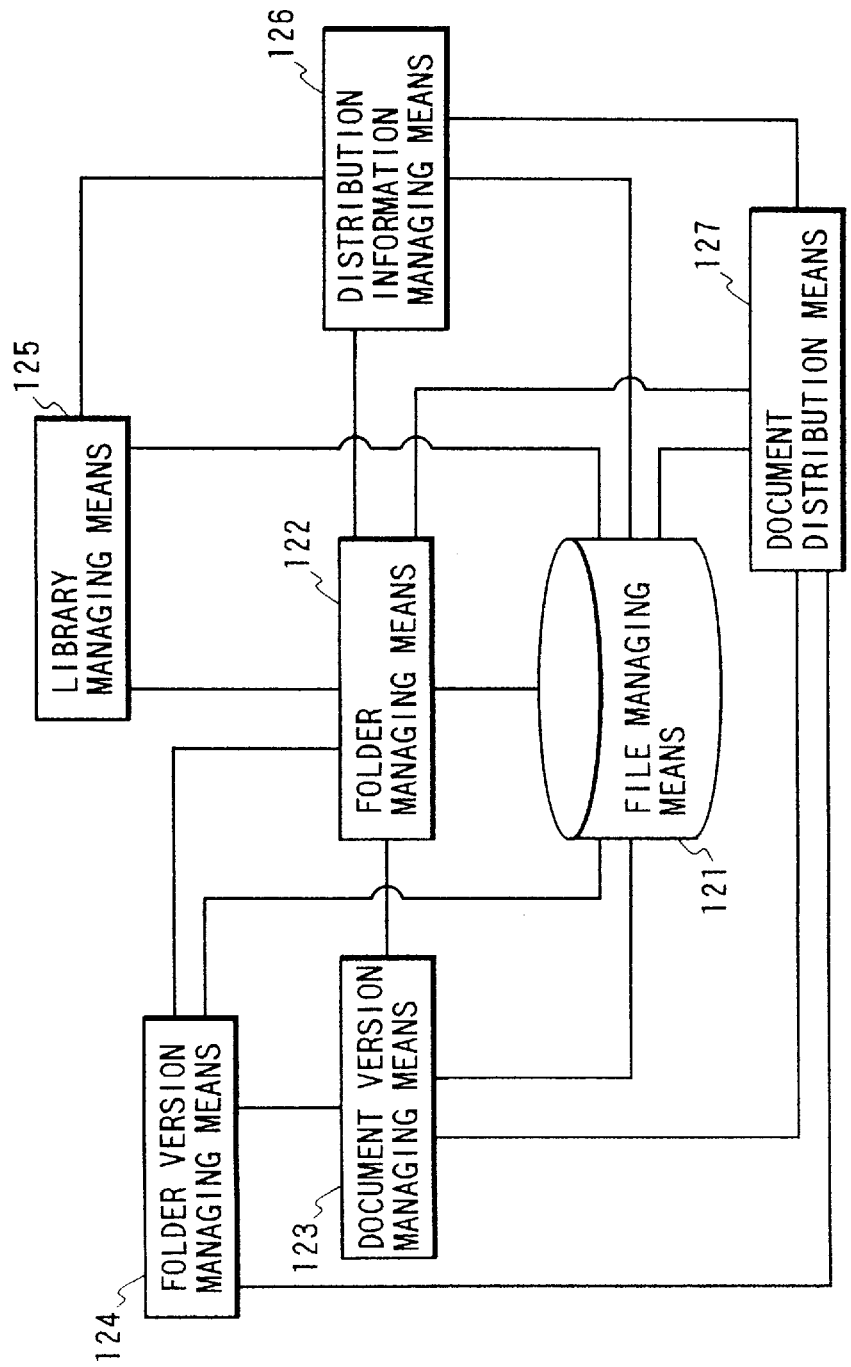
FIG. 12 is a block diagram showing a document storing and managing system according a third embodiment of this invention.

This system has, similarly to the system according to the first embodiment, a file managing means 121, a folder managing means 122, a library managing means 125, a folder version managing means 124 and a document version managing means 123 as shown in FIG. 12. The system further has a distribution information managing means 126 for designating a specific document included in a specific folder in a specific library in order to distribute it to another folders, and a document distributing means 127 for copying a document as a document in the latest version below another folder according to the distribution information managing means 126 to update the version of that folder.

Here, distribution is an operation to copy a specific document included in a specific folder in a specific library as a specific document in the latest version included another specific folder equal to or more than one according to predetermined distribution information. When a document is copied, a version of a folder including the copied document is updated.

Figure 13:
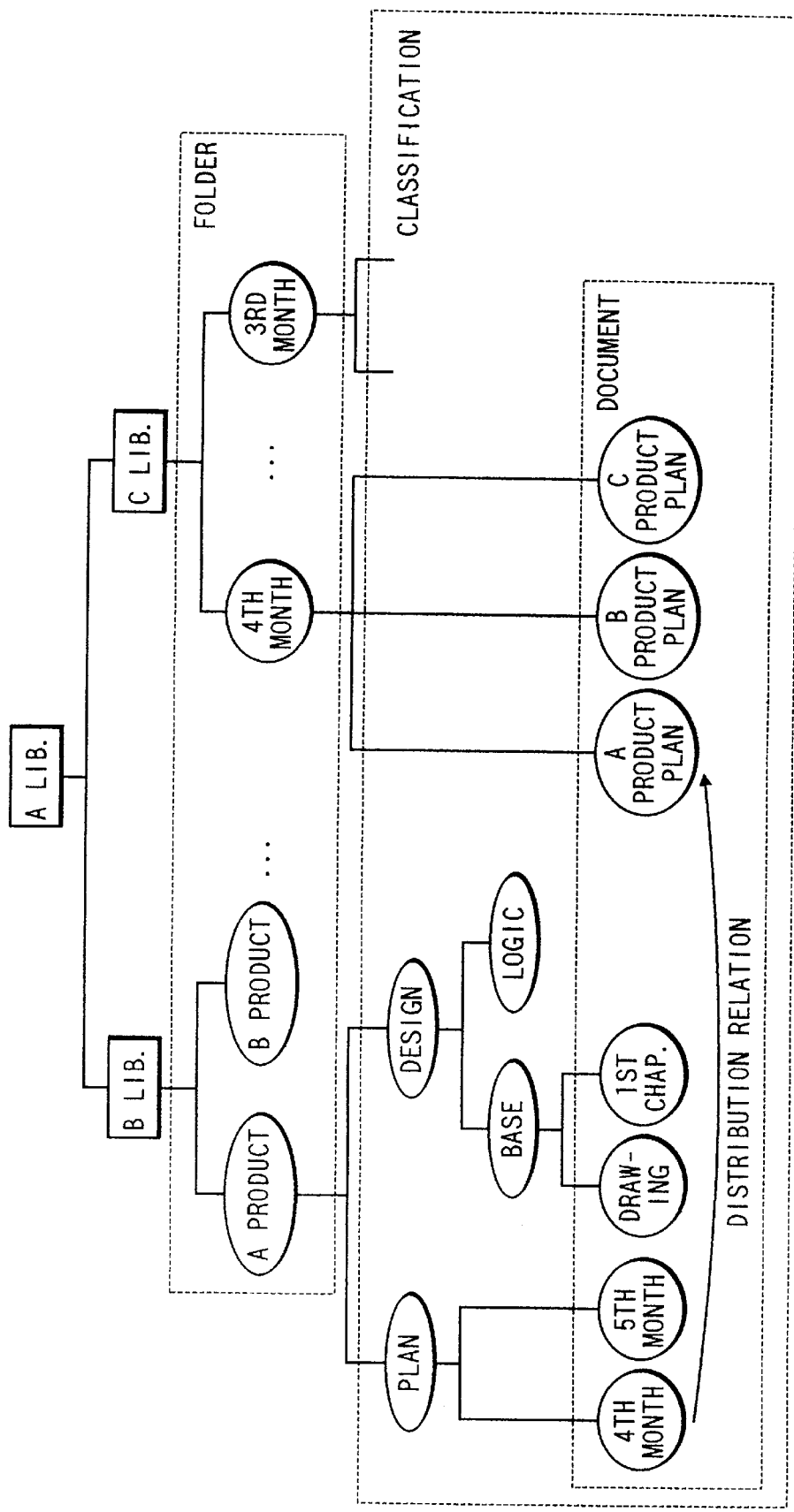
FIG. 13 is a diagram showing a distribution relation of a document in the system according to the third embodiment.

FIG. 13 shows an example of the distribution. This example illustrates that when a new version of a document "4th month" belonging to "Plan" classification of a folder "A Product" accommodated in "B" library below "A" library is made, it is distributed as a new version of a document "A Product Plan" of a folder "4th month" accommodated in "C" library below "A" library.

The user designates such distribution relation, and the distribution information managing means 126 manages the designated distribution relation using a list in which a correlation between a distribution source document and a distribution destination document is described.

Figure 14:
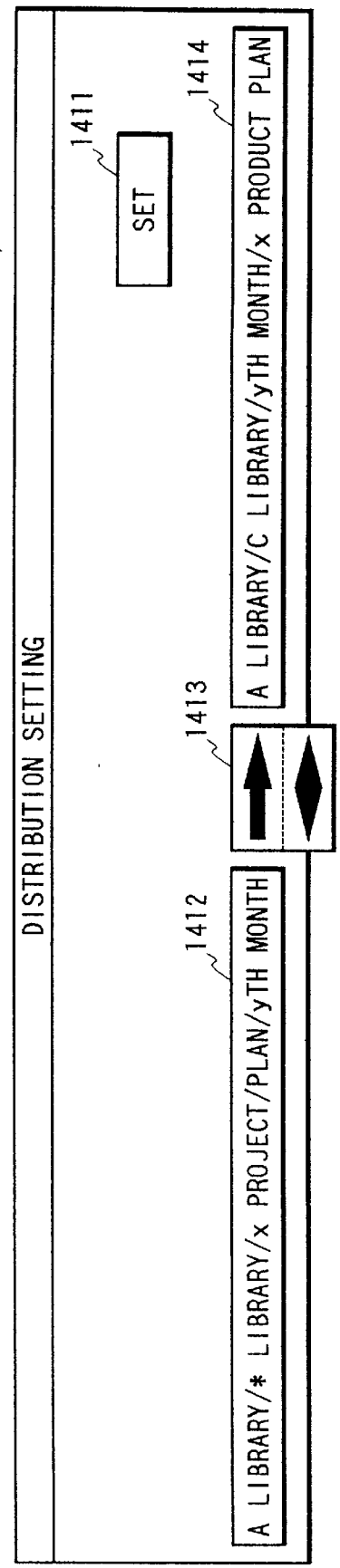
FIG. 14 shows a dialogue window used to set the distribution relation of a document in the system according to the third embodiment.

The user designates a distribution relation through a screen shown, for example, in FIG. 14. In sections 1412 and 1414 in FIG. 14, a document of distribution source and a document of distribution destination are described in a hierarchical structure of a library, a folder, a classification and a document to designate them. In 1413, a direction of the distribution is designated by an arrow. If the document is distributed in both directions, the arrow is attached to the both directions. This example shows that "y-th month" document below "Plan" classification below "x product" folder below "*library" below "A library" is distributed to "x Product Plan" document below "y-th month" below "C library" below "A library". Here, "*" represents coincidence with one character regular expression not less than zero. "x" and "y" represent variables. The same variable in 1412 and 1414 in the drawing has the same one character string. In FIG. 13, the variable "x" is "A", whereas the variable "y" is "4". It is possible to designate the distribution information using another expression defined in the regular expression. In the case of this example, alphabets in half-sized small letters are settled as variables. If a small-letter alphabet appears in a library name or a folder name, another reserved word may be settled as a variable.

When the user pushes a setting execution button 1411, the distribution information managing means 126 describes the set distribution information in a list managed thereby. The list is configured with, as shown in FIG. 16, distributed document information 163 in which a hierarchical expression of the distribution source document or the distribution destination document set through the screen in FIG. 14 is stored in an array, a distribution source table 161 leading the distributed document information 163 of the distribution source document using a pointer, and a distribution destination table 162 leading the distributed document information 163 of the distribution destination document using a pointer.

In the distribution source table 161, there are described a pointer to the highest layer of the distributed document information 163 showing the distribution source document, a pointer to the lowest layer and a pointer showing a column of the distribution destination of the document in the distribution destination table 162. In the distribution destination table 162, there are described a pointer to the highest layer of the distributed document information 163 showing the distribution destination document and a pointer to the lowest layer.

Figure 15:
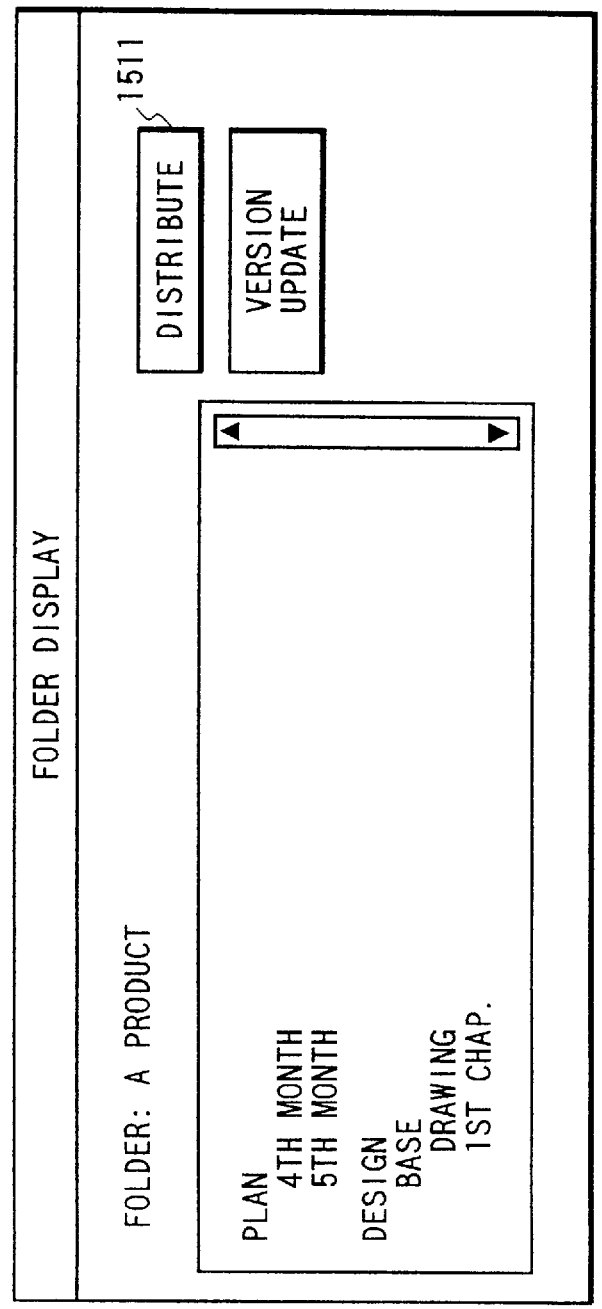
FIG. 15 shows a dialogue window used to display contents of a folder in the system according to the third embodiment.

Distribution of the document is initiated on the basis of an instruction of the user. The user, for example, pushes a distribution button 1511 on a folder displaying screen displaying documents included in the folder shown in FIG. 15 to instruct to distribute the document.

When accepting it, the document distributing means 127 retrieves as to whether there is any document to be distributed below "A Product" folder displayed on the folder displaying screen 151 in each of the distributed document information 163 pointed by the distribution source table 161. If the document distributing means 127 finds corresponding distributing documentation in the retrieval, the document distributing means 127 takes out the distributed document information 163 of the distribution destination from the distribution destination table 162 pointed by the distribution source table 161.

The document distributing means 127 retrieves a library name 412 in the library management information 41, a folder name 312 in the folder management table 31, a classification/document name 321 in the folder definition list 32 according to the distributed document information 163 taken out to obtain a folder ID and a document ID of the distribution destination. Next, the document distributing means 127 retrieves the obtained document ID in the document list 61, and adds a version of a new document to the document version management information 62.

Following that, the document distributing means 127 copies an entity of the distribution source document to make a new document file, and registers it in the document version management information 62. Alternatively, the document distributing means 127 does not copy an entity of the distribution source document but describes an entity file name of the distribution source document in the document version management information 62.

The document distributing means 127 then adds the version of the made document to the folder version management information 52 to update it, makes a new version in the folder list 51, and sets a pointer to the updated folder version management information 52.

In the document storing and managing system of this embodiment, it is possible to commonly possess one document in plural folders. Once a relation between the documents is established, it is possible to distribute contents of an updated document when the document is updated without necessity of tracing a copy destination by the user.

Further, it is possible to manage one document by different names in plural folders so that the user can freely use it as different documents since version management for each folder is possible.

What is claimed is:

1. A document storing and managing system for storing plural electronic documents in each of folders according to classifications and managing the stored electronic documents in a unit of said folder comprising:

a folder managing means for managing attributes of said electronic documents included in each of said folders;

a document version managing means for managing information as to versions of said electronic documents included in each of said folders; and a folder version managing means for managing a correspondence relation between a version of said folder and a version of each of said electronic documents included in said folder.

2. The document storing and managing system according to claim 1 further comprising a library managing means for collecting a plurality of said folders to manage them.

3. The document storing and managing system according to claim 1, wherein said folder version managing means manages a correspondence relation between a version of said folder and a version of said electronic document selected by the user correspondingly thereto.

4. The document storing and managing system according to claim 1, wherein if the user omits designation of a version of said electronic document, said folder version managing means assumes that the latest version is selected so as to set said correspondence relation of said electronic document.

5. A document storing and managing system for storing plural electronic documents in each of a plurality of folders according to classifications and managing the stored electronic documents in a unit of said folder comprising:

a folder managing means for managing attributes of said electronic documents included in each of said folders;

a document version managing means for managing information as to versions of said electronic documents included in each of said folders;

a folder version managing means for managing a correspondence relation between a version of said folder and a version of each of said electronic documents included in said folder;

a folder retrieving means for retrieving a folder including an electronic document or a classification coinciding with designated retrieval conditions among designated objects of retrieval; and a document retrieving means for retrieving an electronic document that is an object of said retrieval included in the retrieved folder.

6. The document storing and managing system according to claim 5, wherein said folder retrieving means retrieves a folder in a version designated as an object of retrieval.

7. The document storing and managing system according to claim 6, wherein said folder that is an object of the retrieval has n designated versions, said n versions counted from the latest version of said folder in the order of their ages.

8. The document storing and managing system according to claim 5, wherein said document retrieving means retrieves electronic documents included in the folder in a version retrieved by said folder retrieving means and presents a result of the retrieval.

9. The document storing and managing system according to claim 5, wherein as said retrieval conditions, a classification/document name and a keyword included in said classification/document name are designated.

10. The document storing and managing system according to claim 9, wherein said designation of a classification/document name is made in a regular expression.

11. A document storing and managing system for storing plural electronic documents in each of folders according to classifications and managing the stored electronic documents in a unit of said folder comprising:

a folder managing means for managing attributes of said electronic documents included in each of said folders;

a document version managing means for managing information as to versions of said electronic documents included in each of said folders;

a folder version managing means for managing a correspondence relation between a version of said folder and a version of each of said electronic documents included in said folder; and a document entity moving means for moving a place for storing files of all electronic documents in designated versions in said folder.

12. The document storing and managing system according to claim 11, wherein said document entity moving means moves said place for storing files of the electronic documents to a low-speed, large-capacity medium.

13. The document storing and managing system according to claim 12, wherein said document entity moving means designates a document in a version which exceeds a predetermined number counted from the latest version of said folder as an object of the move.

14. The document storing and managing means according to claim 12, wherein said document entity moving means designates as an object of the move a document in a version stored for a period which exceeds a predetermined period elapsed from when said document was made.

15. A document storing and managing system for storing plural electronic documents in each of folders according to classifications and managing the stored electronic documents in a unit of said folder comprising:

a folder managing means for managing attributes of said electronic documents included in each of said folders;

a document version managing means for managing information as to versions of said electronic documents included in each of said folder;

a folder version managing means for managing a correspondence relation between a version of said folder and a version of each of said electronic documents included in said folder; and a document entity deleting means for deleting files of all electronic documents in designated versions in said folder.

16. The document storing and managing system according to claim 15, wherein said document entity deleting means designates a document in a version which exceeds a predetermined number counted from the latest version of said folder as an object of the deletion.

17. The document storing and managing means according to claim 15, wherein said document entity deleting means designates as an object of the deletion a document in a version stored for a period which exceeds a predetermined period elapsed from when said document was made.

18. A document storing and managing system for storing plural electronic documents in each of folders according to classifications and managing the stored electronic documents in a unit of said folder comprising:

a folder managing means for managing attributes of said electronic documents included in each of said folder;

a document version managing means for managing information as to versions of said electronic documents included in said folder;

a folder version managing means for managing a correspondence relation between a version of said folder and a version of each of said electronic documents included in said folder;

a distribution information managing means for managing distribution information designating a distribution destination of a specific electronic document included in a specific folder; and a document distributing means for copying said specific electronic document included in the latest version of said folder as the latest version of a specific electronic document of a folder that is a distribution destination according to said distribution information to update a version of said folder that is the distribution destination.

19. The document storing and managing system according to claim 1, wherein said folder version managing means manages said correspondence relation so that said version of said folder is a collection of specific versions of said electronic documents included therein.

20. The document storing and managing system according to claim 11, wherein said folder version managing means manages said correspondence relation so that said version of said folder is a collection of specific versions of said electronic documents included therein.

* * * * *